(No Model.)
W. E. HARRIS.
ROLLING MILL.
No. 252,460.
4 Sheets—Sheet 1.
Patented Jan. 17, 1882.
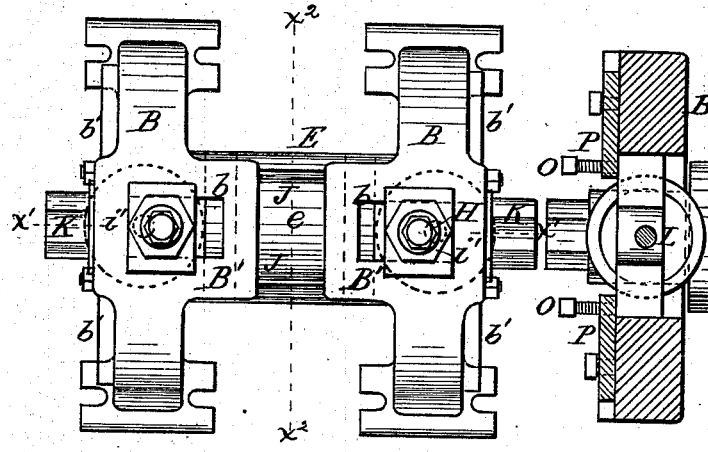
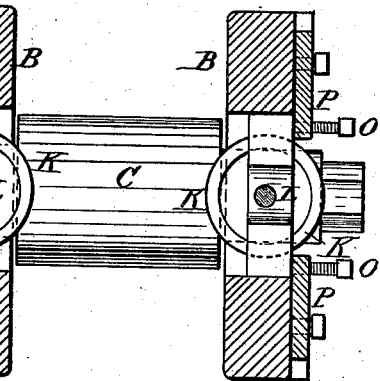
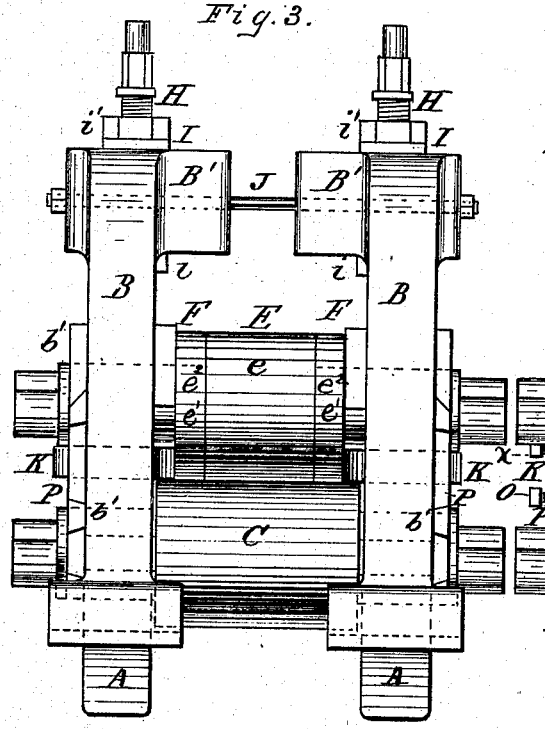
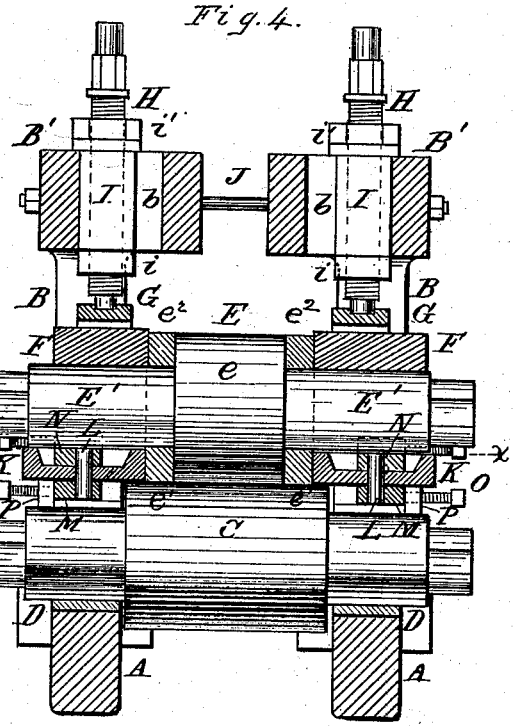
Witnesses:
Geo. H. Knight.
August Weber.
Inventor:
William E. Harris
By Knight Bros.
Attys.

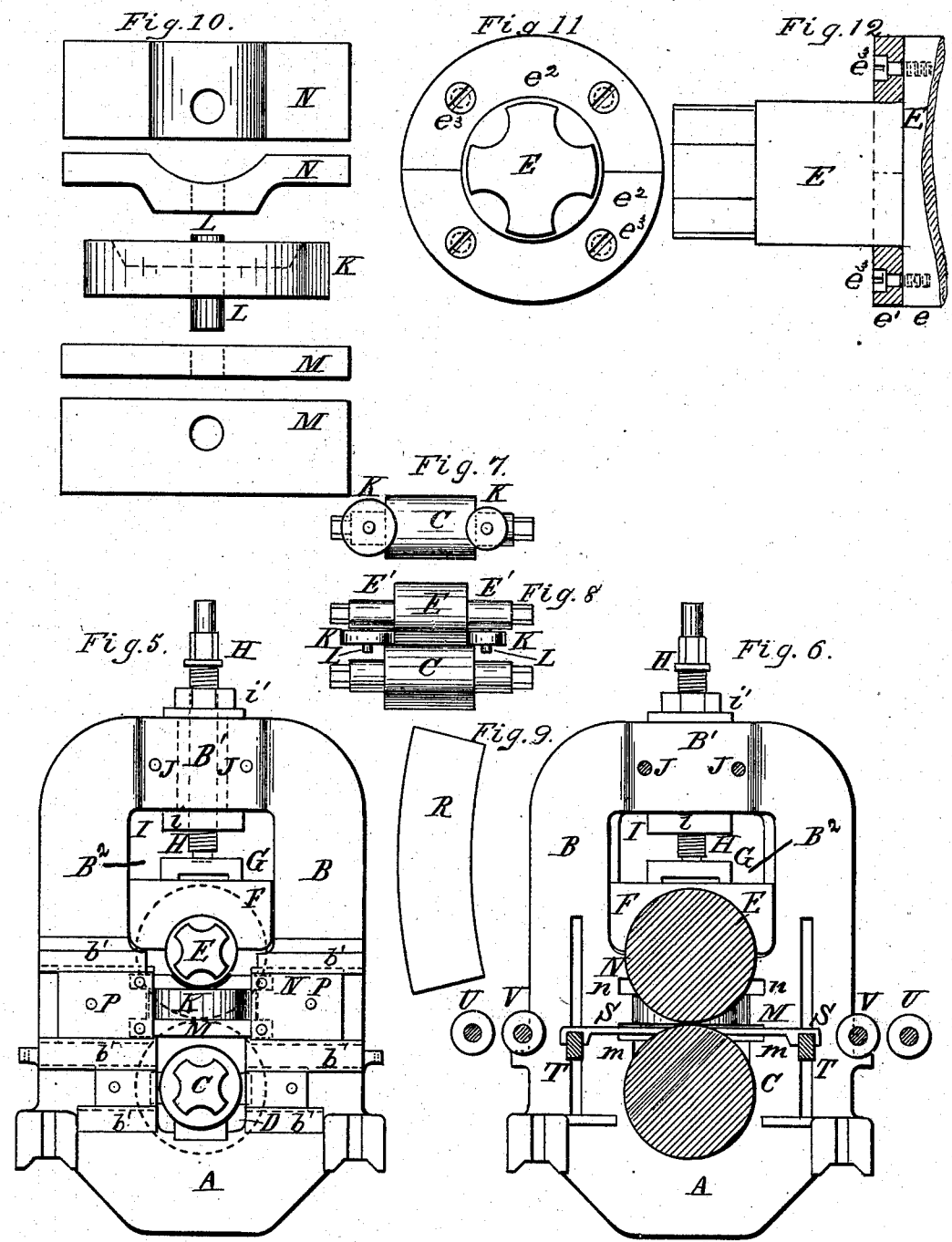

(No Model.) 4 Sheets—Sheet 3.

W. E. HARRIS.
ROLLING MILL.

No. 252,460. Patented Jan. 17, 1882.

Witnesses:
Geo. H. Knight.
August Weber

Inventor:
William E. Harris
By Knight Bros.
Attys.

(No Model.) 4 Sheets—Sheet 4.
W. E. HARRIS.
ROLLING MILL.
No. 252,460. Patented Jan. 17, 1882.
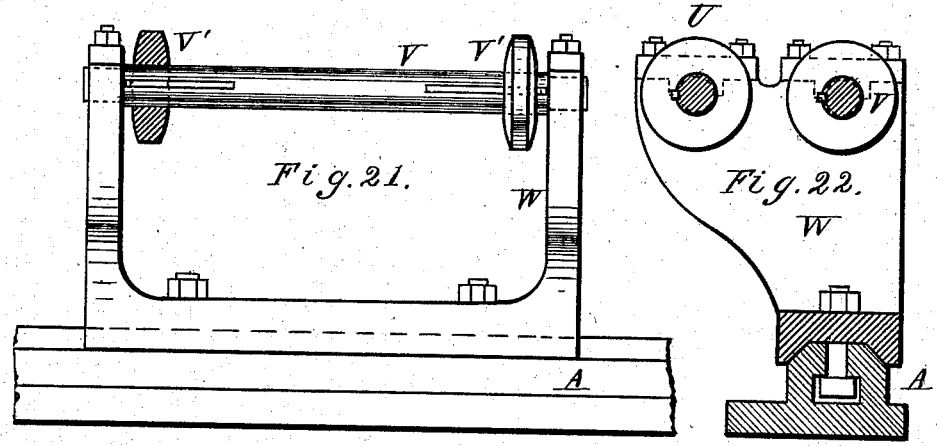
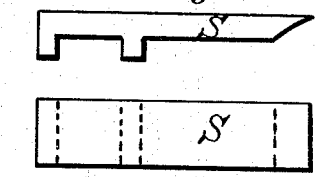
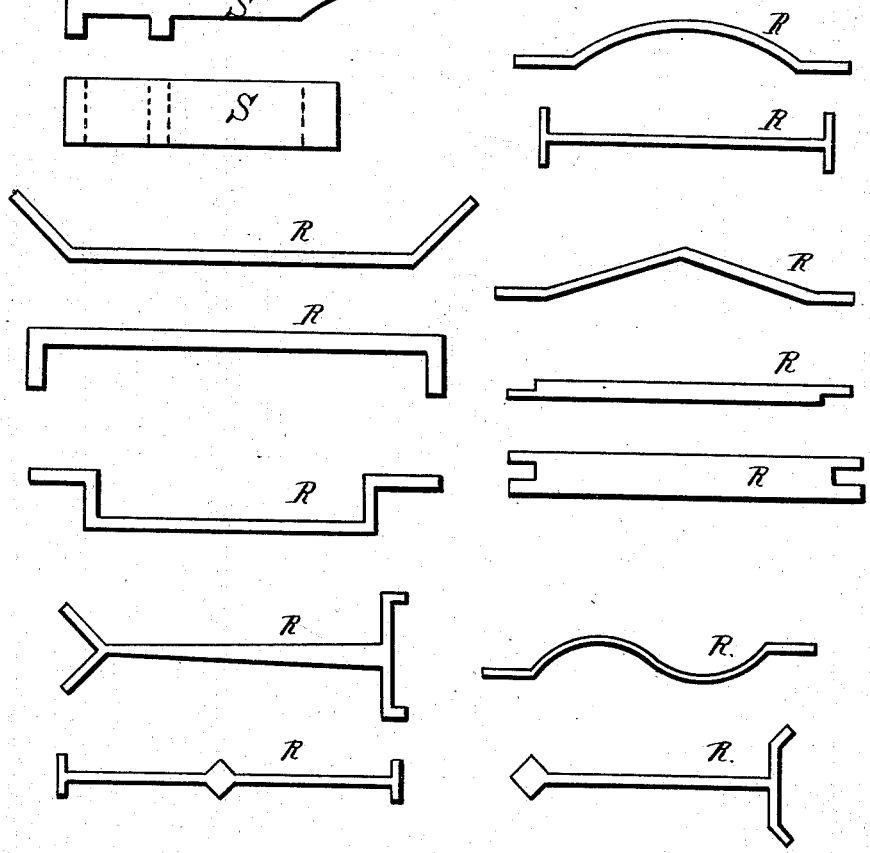

UNITED STATES PATENT OFFICE.

WILLIAM E. HARRIS, OF ST. LOUIS, MISSOURI.

ROLLING-MILL.

SPECIFICATION forming part of Letters Patent No. 252,460, dated January 17, 1882.

Application filed July 28, 1881. (No model.)

*To all whom it may concern:*

Be it known that I, WILLIAM E. HARRIS, of the city of St. Louis, in the State of Missouri, have invented certain new and useful Improvements in Rolling-Mills, of which the following is a full, clear, and exact description, reference being had to the accompanying drawings, making part of this specification.

My improvement relates to the construction of metal-rolling machines in which lateral pressure is applied to the bar or plate simultaneously with the pressure at top and bottom of the same.

Figure 13:
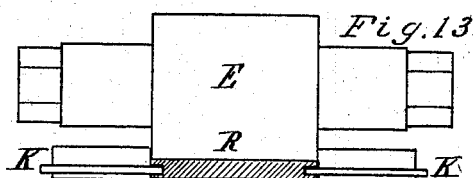
Figure 17:
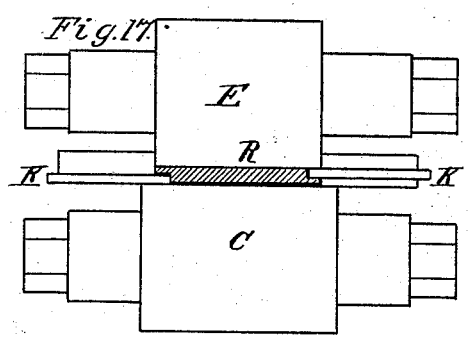
Figure 14:
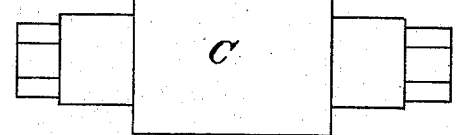
Figure 18:
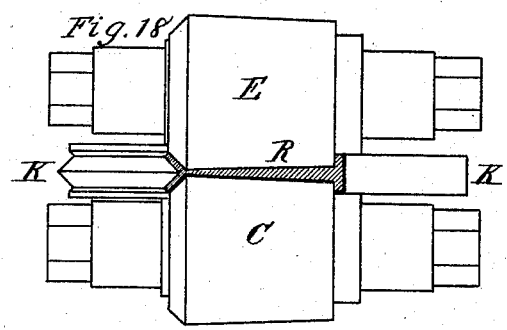
Figure 15:
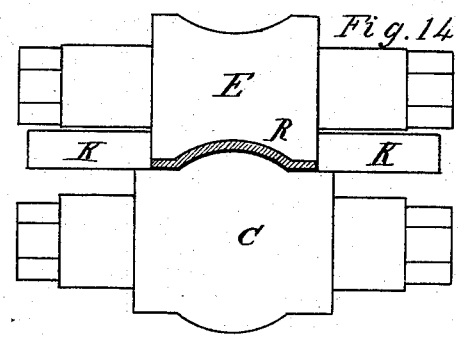
Figure 19:
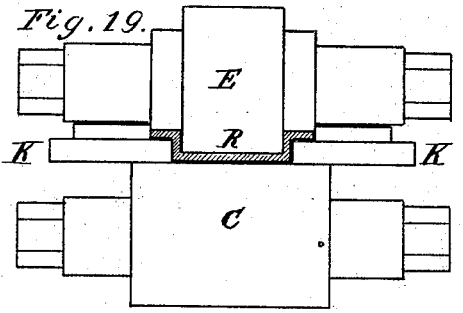
Figure 16:
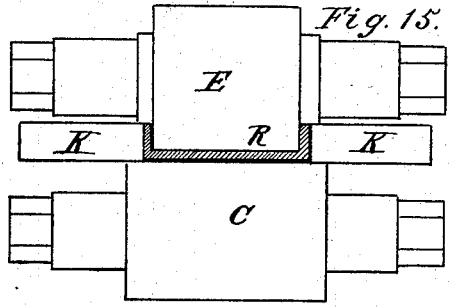
Figure 20:
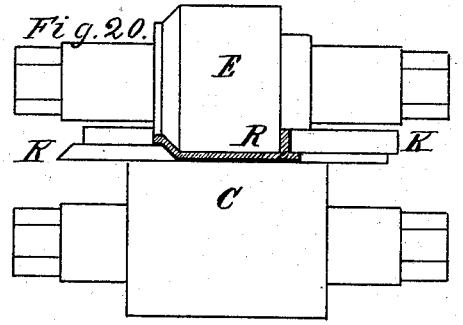

In the drawings, Figure 1 is a top view of sufficient of the machine to exhibit my improvement. Fig. 2 is a horizontal section at $x$ $x$, Fig. 4. Fig. 3 is a front elevation. Fig. 4 is a vertical section at $x'$ $x'$, Fig. 1. Fig. 5 is an end elevation. Fig. 6 is a vertical section at $x^2$ $x^2$, Fig. 1. Fig. 7 is a detail top view on a reduced scale, of the lower roll and the two edging-rolls, showing the latter of different diameters, and Fig. 8 is a side view of the same with the upper roll added. Fig. 9 is a top view of a curved plate produced by the construction of edging-rolls shown in Figs. 7 and 8. Fig. 10 is a view showing one of the edging-rolls and its boxes detached from the machine and from each other. Fig. 11 is an end view of the upper roll. Fig. 12 is a part side view of the same, showing the detachable segments in section. Figs. 13 to 20 show various forms of rolls for producing plates and bars of various cross sectional shapes, said sections being shown by lines as usual. Fig. 21 is an elevation of a rolling guide and stand; and Fig. 22 is a transverse section of the same, showing the connection with the bed-plate. Fig. 23 shows a side and top view of the guide. Under Fig. 24 are shown various forms of bars and plates in end view, such as may be produced on my improved machine.

A is the bed-plate, and B the housings or standards supporting the rolls.

C is the lower roll, and D the journal-boxes or brasses of the same. No novelty is claimed in the construction or this roll, except it may be in some new form of working-face.

E is the upper roll, working in brasses F. The working-face $e$ of this roll is made usually equal in length to the width of the rolled bar or plate. The working face has a plain cylindrical or frusto-conical or a grooved and ribbed or compound form, as illustrated in the drawings, or otherwise.

$e^2$ $e^2$ are segments forming together collars $e'$, which collars constitute part of the working-face of the roll. These collars or rings are used when it is required to lengthen the working-face of the roll, and are secured in position by screws $e^3$ or otherwise. The diameter of the segmental rings $e'$ may be greater or less than the central part, $e$, or said rings may be of the required form to give any required peculiarity of shape to the rolled metal. There may be any required number of the supplemental rings $e'$.

G is a bearing-block resting on the top of each brass F.

H is a screw by which the block and brass are pressed down. The screw H screws in a nut, I, that is adjustable in a slot, $b$, in the head B' of the housing. The slot $b$ extends in the direction of the roll-journal, so that the block can at all times be so placed as to be over the mid-length of the journal E' of the roll E. The reason for this construction is that it is found that the journal is liable to be broken off the roll when the pressure is not over its mid-length, especially when the bearing is nearer its outer end. The nut I has shoulders $i$, bearing against the under side of the head B'.

$i'$ is a nut, screwing upon the upper end of the nut I, and bearing upon the top of the head B' through the medium of a washer-plate. Thus, by means of the shoulders $i$ and the nut $i'$, the nut I is held in position in the slot $b$.

J are tie-bars connecting the heads B'.

K are the edging-rollers. Each edging-roller is supported on a vertical shaft, (or gudgeons,) L, having bearing in boxes M and N. These boxes rest in recesses $m$ and $n$ in the housing, in which recesses they are adjustable inward and outward by means of set-screws O, which screw in plates P, the set-screws bearing against the outer sides of the boxes M and N. The plates P are attached to the outer sides of the housings in any suitable manner. I show them with beveled edges, engaged by cleats $b'$, cast upon the housings. The bottom of each edging-roller rests upon the top of the lower roll, C, and the periphery of the edging-roll usually bears against the end of the upper roll, E, close to the working-face e or e', so that the edging-rolls K work upon the edges of the rolled plate or bar and keep the metal from spreading laterally or forming fins at the corners. The periphery of the edging-roll may be variously formed, so as to finish the edge of the plate or bar with a groove, (see Fig. 13,) a rabbet, (see Fig. 17,) a re-entering-angle, (see Fig. 18,) or any other desired shape, some other shapes being illustrated in Figs. 16, 19, and 20, and under Fig. 24.

In Figs. 7 and 8 the edging-roller K upon one side is of greater diameter than the edging-roller upon the other side. The effect of this is to impart to the rolled plate or bar a curved form in the plane of its width. (See Fig. 9.) The major or outer curve is at the edge in contact with the longer roller K, and the minor or inner curve at the edge in contact with the roller K having the smaller diameter. This feature is applicable to plates or bars having any form in transverse section. The curve will be in proportion to disparity in diameter of the rolls K.

The movable guides are shown at S, and the cramp-bar, on which the guides are supported in the ordinary manner, is shown at T.

U and V are rolling-guides, supported on standards W. The guide V has adjustable collars V', fixed to the roller by keys and forming side guides for the plate or bar. (See Fig. 21.)

B² are openings in the upper parts of the housings sufficiently large to allow the passage of the rolls C and E endwise, so that the rolls can be removed without moving either of the housings on the bed-plate. The top roll is raised or counterbalanced by weighted levers or in any other suitable manner.

It will be observed that in my machine the lower roll is mounted in fixed bearings, while the upper roll is mounted immediately thereover in adjustable bearings, and can be raised or lowered independently of the side vertical rollers. Both the vertical rollers work over the lower roll and are adjustable lengthwise thereof, so as to work against the ends of the upper roll. This arrangement of rolls and rollers enables the machine to do work that cannot be accomplished by other machines in which lateral pressure is imparted to the bar under treatment.

Having thus described my invention, the following is what I claim as new therein and desire to secure by Letters Patent—

1. The combination of extensible upper rolls, E, lower rolls, C, and vertical rollers K, the latter working over the lower roll and at the ends of upper roll, as set forth.

2. The combination, with a lower roll, C, and an upper roll, E, of edging-rolls K, varying in diameter.

3. The combination, with a roller, E, of supplemental rings e', for the purpose set forth.

4. The combination, with a roller, E, having an extensible working-face, of the adjustable bearing device F G H I, substantially as set forth.

WILLIAM E. HARRIS.

Witnesses:
 SAML. KNIGHT,
 J. E. KNIGHT.